(12) United States Patent
Ding et al.

(10) Patent No.: US 11,496,339 B2
(45) Date of Patent: Nov. 8, 2022

(54) DOPPLER SPREAD ESTIMATION BASED ON SUPERVISED LEARNING

(71) Applicant: Samsung Electronics Co., Ltd., Suwon-si (KR)

(72) Inventors: Yacong Ding, San Diego, CA (US); Hyukjoon Kwon, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 16/912,543

(22) Filed: Jun. 25, 2020

(65) Prior Publication Data

US 2021/0314197 A1    Oct. 7, 2021

Related U.S. Application Data

(60) Provisional application No. 63/004,894, filed on Apr. 3, 2020.

(51) Int. Cl.
| | | |
|---|---|---|
| *H04L 25/02* | (2006.01) | |
| *G06N 5/04* | (2006.01) | |
| *G06N 20/00* | (2019.01) | |
| *H04L 5/00* | (2006.01) | |

(52) U.S. Cl.
CPC .......... *H04L 25/0254* (2013.01); *G06N 5/04* (2013.01); *G06N 20/00* (2019.01); *H04L 5/0048* (2013.01); *H04L 25/0224* (2013.01)

(58) Field of Classification Search
CPC .............. H04L 25/0254; H04L 5/0048; H04L 25/0224; H04L 25/0222; H04L 25/0212; H04B 17/364; H04B 17/373; H04B 17/336; H04B 1/1027; G06N 5/04; G06N 20/00

See application file for complete search history.

(56) References Cited

U.S. PATENT DOCUMENTS

| | | | |
|---|---|---|---|
| 9,057,772 B1* | 6/2015 | Chavez | H04B 17/27 |
| 10,111,152 B2* | 10/2018 | Axmon | H04W 84/005 |

(Continued)

OTHER PUBLICATIONS

"A Two-Hop MIMO Relay Architecture Using LTE and Millimeter Wave Bands in High Speed Trains"; Olivia et al.; 2018 IEEE Wireless Communications and Networking Conference (WCNC): Special Session Workshops; Apr. 2018 (Year: 2018).*

(Continued)

*Primary Examiner* — Benjamin H Elliott, IV
(74) *Attorney, Agent, or Firm* — Lewis Roca Rothgerber Christie LLP

(57) ABSTRACT

A radio receiver includes a channel estimator processing circuit including: a feature extractor configured to extract one or more features from a received signal, the features including a channel correlation estimated based on a reference signal in a current slot, the estimated channel correlation indicating a rate of change of a wireless channel over time; and a Doppler spread estimator configured to estimate a Doppler spread of the wireless channel by supplying the features to one or more Doppler shift predictors trained on training data across a training signal-to-noise ratio (SNR) range and across a training Doppler shift range, each Doppler shift predictor being trained on a portion of the training data corresponding to a different portion of the training data.

26 Claims, 12 Drawing Sheets

(56) References Cited

U.S. PATENT DOCUMENTS

| | | | |
|---|---|---|---|
| 2004/0097197 A1* | 5/2004 | Juncker | H04B 17/20 455/67.11 |
| 2005/0002461 A1* | 1/2005 | Giannakis | H04L 25/0228 375/259 |
| 2009/0067558 A1* | 3/2009 | Mourad | H04B 1/1027 375/348 |
| 2010/0109938 A1* | 5/2010 | Oswald | G01S 13/522 342/90 |
| 2011/0287778 A1* | 11/2011 | Levin | H04W 64/006 455/456.1 |
| 2014/0071843 A1* | 3/2014 | Noune | H04L 25/0228 370/252 |
| 2016/0255618 A1* | 9/2016 | Forenza | H04W 72/082 370/230 |
| 2016/0259061 A1* | 9/2016 | Carter | G01S 19/05 |
| 2019/0096209 A1* | 3/2019 | Chen | H04W 4/80 |
| 2019/0204409 A1* | 7/2019 | Booij | H04W 64/00 |
| 2019/0239098 A1* | 8/2019 | Lee | H04W 24/08 |
| 2019/0353800 A1* | 11/2019 | Ni | G01S 19/29 |
| 2019/0387520 A1* | 12/2019 | Ghosh | H04L 1/004 |
| 2020/0052931 A1* | 2/2020 | Fechtel | H04L 25/03159 |
| 2020/0142029 A1* | 5/2020 | Brooker | G01S 7/415 |
| 2020/0266910 A1* | 8/2020 | O'Shea | H04B 17/3913 |
| 2020/0304259 A1* | 9/2020 | Ihalainen | H04W 72/04 |
| 2020/0400821 A1* | 12/2020 | Baker | G01S 7/4804 |
| 2021/0278523 A1* | 9/2021 | Urtasun | G01S 13/931 |
| 2021/0314197 A1* | 10/2021 | Ding | H04B 17/336 |

OTHER PUBLICATIONS

"The Impact of Beamwidth on Temporal Channel Variation in Vehicular Channels and Its Implications"; Va et al.; IEEE Transactions on Vehicular Technology, vol. 66, No. 6, Jun. 2017 (Year: 2017).*

"Doppler spread analysis of high-speed train measurements at 5.2 GHz"; Fraunhofer IIS et al.; 3GPP TSG AN WG1#99 R1-1912667 Reno, USA, Nov. 18-22, 2019 (Year: 2019).*

"Basic Relationship between Channel Coherence Time and Beamwidth in Vehicular Channels"; Va et al.; 2015 IEEE 82nd Vehicular Technology Conference (VTC2015-Fall); Sep. 2015 (Year: 2015).*

Aldossari, Saud et al., "Machine Learning for Wireless Communication Channel Modeling: An Overview," Wireless Personal Communications, Mar. 21, 2019, Springer Science+Business Media, LLC, part of Springer Nature 2019, 31 pages.

Tse, David, et al. "Fundamentals of Wireless Communication," Draft to be published by Cambridge University Press, Sep. 10, 2004, 647 pages.

Battiti, Roberto, "Using Mutual Information for Selecting Features in Supervised Neural Net Learning," IEEE Transactions on Neural Networks, vol. 5, No. 4, Jul. 1994, pp. 537-550.

Noh, Gosan et al., "mm Wave-based Mobile Backhaul Transceiver for High Speed Train Communication Systems," IEEE 2017, 5 sheets.

Liang, Le et al., "Vehicular Communications: A Physical Layer Perspective," arXiv:1704.05746v3 [cs.IT] Sep. 15, 2017, 13 sheets.

Va, Vutha et al., "The Impact of Beamwidth on Temporal Channel Variation in Vehicular Channels and its Implications," arXiv:1511.02937v1 [cs.IT] Nov. 9, 2015, 33 sheets.

* cited by examiner

DOPPLER SPREAD ESTIMATION BASED ON SUPERVISED LEARNING

CROSS-REFERENCE TO RELATED APPLICATION(S)

This application claims priority to and the benefit of U.S. Provisional Patent Application No. 63/004,894, filed in the United States Patent and Trademark Office on Apr. 3, 2020, the entire disclosure of which is incorporated by reference herein.

FIELD

Aspects of embodiments of the present disclosure relate wireless communications and Doppler spread estimation based on supervised learning.

BACKGROUND

In the field of wireless communications, radio transceivers monitor the properties of the communication channels in order to adapt to changing signal propagation conditions of the electromagnetic environment. These properties are generally referred to as channel state information (CSI) and may include effects such as scattering, fading, power decay, and Doppler spread. A channel estimation (CE) block of a radio transceiver may be used to estimate the CSI of various channels of a received radio signal in an operating frequency range of the radio transceiver.

In the field of wireless communications, a radio receiver may receive a Doppler shifted version of a transmitted signal when the radio transmitter and the radio receiver are moving relative to one another. For example, in the case of a cellular land mobile radio system, a base station (e.g., cellular tower) is generally fixed, while one or more mobile stations (e.g., smartphones) that are communicating with the base station may be stationary or moving. Generally, the frequency of the received signal will be shifted up (increased) when the mobile station is moving toward the base station, and the frequency of the received signal will be shifted down (decreased) when the mobile station is moving away from the base station. For example, the magnitude of the observed Doppler shift $f_d$ will generally be larger when the mobile station is in a fast-moving car than when the mobile station is resting on a desk top in an office. The broadening of the frequency spectrum of the transmitted signal due to the rate of change in the Doppler shift is referred to as Doppler spread $D_s$.

Doppler spread is generally used for time interpolation in the channel estimation block of a radio, as well as for some software control, as part of the system for the radio to adapt transmissions to current channel conditions in order to achieve reliable communications.

SUMMARY

Aspects of embodiments of the present disclosure relate to systems and methods for estimating Doppler spread based on supervised machine learning.

According to one embodiment of the present disclosure, a method for estimating Doppler spread of a wireless channel includes: extracting, by a processing circuit of a radio receiver, one or more features from a received signal, the features including an estimated channel correlation in a current slot, the estimated channel correlation indicating a rate of change of the wireless channel over time; and computing, by the processing circuit, a Doppler spread of the wireless channel by supplying the features to one or more Doppler shift predictors trained on training data across a training signal-to-noise ratio (SNR) range and across a training Doppler shift range, each Doppler shift predictor being trained on a portion of the training data corresponding to a different portion of the training data.

The estimated channel correlation may include a single infinite-impulse response-filtered channel correlation.

The features may include one or more estimated channel correlations based on one or more reference signals in one or more previous slots.

The reference signal may be a tracking reference signal.

Each of the Doppler shift predictors may be trained based on a different sub-range of the training SNR range, each sub-range having a lower bound and an upper bound, and method may further include: determining a current SNR of the received signal; and selecting a Doppler shift predictor from among the Doppler shift predictors based on the current SNR, the lower bound of the corresponding sub-range of the selected Doppler shift predictor being higher than the current SNR.

The lower bound of the corresponding sub-range of the selected Doppler shift predictor may be closest to the current SNR among the lower bounds of sub-ranges that are higher than the current SNR.

Each of the Doppler shift predictors may be trained based on a different sub-range of the training Doppler shift range, and the method may further include: computing, by the processing circuit, one or more classification probabilities by supplying the features to a Doppler shift classifier network, each of the classification probabilities corresponding to a different one of the Doppler shift predictors, the features may be supplied to the Doppler shift predictors to compute one or more predicted Doppler shifts, and the computing the Doppler spread may include combining the predicted Doppler shifts in accordance with the classification probabilities.

The combining the predicted Doppler shifts may include summing one or more products of the predicted Doppler shifts multiplied by corresponding ones of the classification probabilities.

The combining the predicted Doppler shifts may include outputting, from among the predicted Doppler shifts, a highest probability predicted Doppler shift corresponding to a highest classification probability of the classification probabilities.

The training SNR range of the training data may be larger than an operating SNR range of the radio receiver.

Each of the Doppler shift predictors may be trained to compute a predicted Doppler shift based on a regression model.

Each of the Doppler shift predictors may be trained to classify the features by computing one or more probabilities that the features correspond to each of one or more ranges of Doppler shifts.

Each of the Doppler shift predictors may be a multi-layer perceptron (MLP).

According to one embodiment of the present disclosure, a radio receiver includes a channel estimator processing circuit, the channel estimator processing circuit including: a feature extractor configured to extract one or more features from a received signal, the features including an estimated channel correlation in a current slot, the estimated channel correlation indicating a rate of change of a wireless channel over time; and a Doppler spread estimator configured to estimate a Doppler spread of the wireless channel by supplying the features to one or more Doppler shift predictors trained on training data across a training signal-to-noise ratio (SNR) range and across a training Doppler shift range, each Doppler shift predictor being trained on a portion of the training data corresponding to a different portion of the training data.

The estimated channel correlation may include a single infinite-impulse response-filtered channel correlation.

The features may include one or more estimated channel correlations based on one or more reference signals in one or more previous slots.

The reference signal may be a tracking reference signal.

Each of the Doppler shift predictors may be trained based on a different sub-range of the training SNR range, each sub-range having a lower bound and an upper bound, and the channel estimator processing circuit may further include: an SNR extractor configured to extract a current SNR of the received signal; and a predictor selector configured to select a Doppler shift predictor from among the Doppler shift predictors based on the current SNR, the lower bound of the corresponding sub-range the selected Doppler shift predictor being higher than the current SNR.

The lower bound of the corresponding sub-range of the selected Doppler shift predictor may be closest to the current SNR among the lower bounds of sub-ranges that are higher than the current SNR.

Each of the Doppler shift predictors may be trained based on a different sub-range of the training Doppler shift range, and the Doppler spread estimator may include a Doppler shift classifier network configured to compute one or more classification probabilities that the input features belong to classes corresponding to the Doppler shift predictors, the Doppler spread estimator may be configured to supply the features to the Doppler shift predictors to compute one or more predicted Doppler shifts, and the Doppler spread estimator may be configured to compute the Doppler spread by combining the predicted Doppler shifts in accordance with the classification probabilities.

The Doppler spread estimator may be configured to combine the predicted Doppler shifts by summing one or more products of the predicted Doppler shifts multiplied by corresponding ones of the classification probabilities.

The Doppler spread estimator may be configured to combine the predicted Doppler shifts by outputting, from among the predicted Doppler shifts, a highest probability predicted Doppler shift corresponding to a highest classification probability of the classification probabilities.

The training SNR range of the training data may be larger than an operating SNR range of the radio receiver.

Each of the Doppler shift predictors may be trained to compute a predicted Doppler shift based on a regression model.

Each of the Doppler shift predictors may be trained to classify the features by computing one or more probabilities that the features correspond to each of one or more ranges of Doppler shifts.

Each of the Doppler shift predictors may be a multi-layer perceptron.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1:
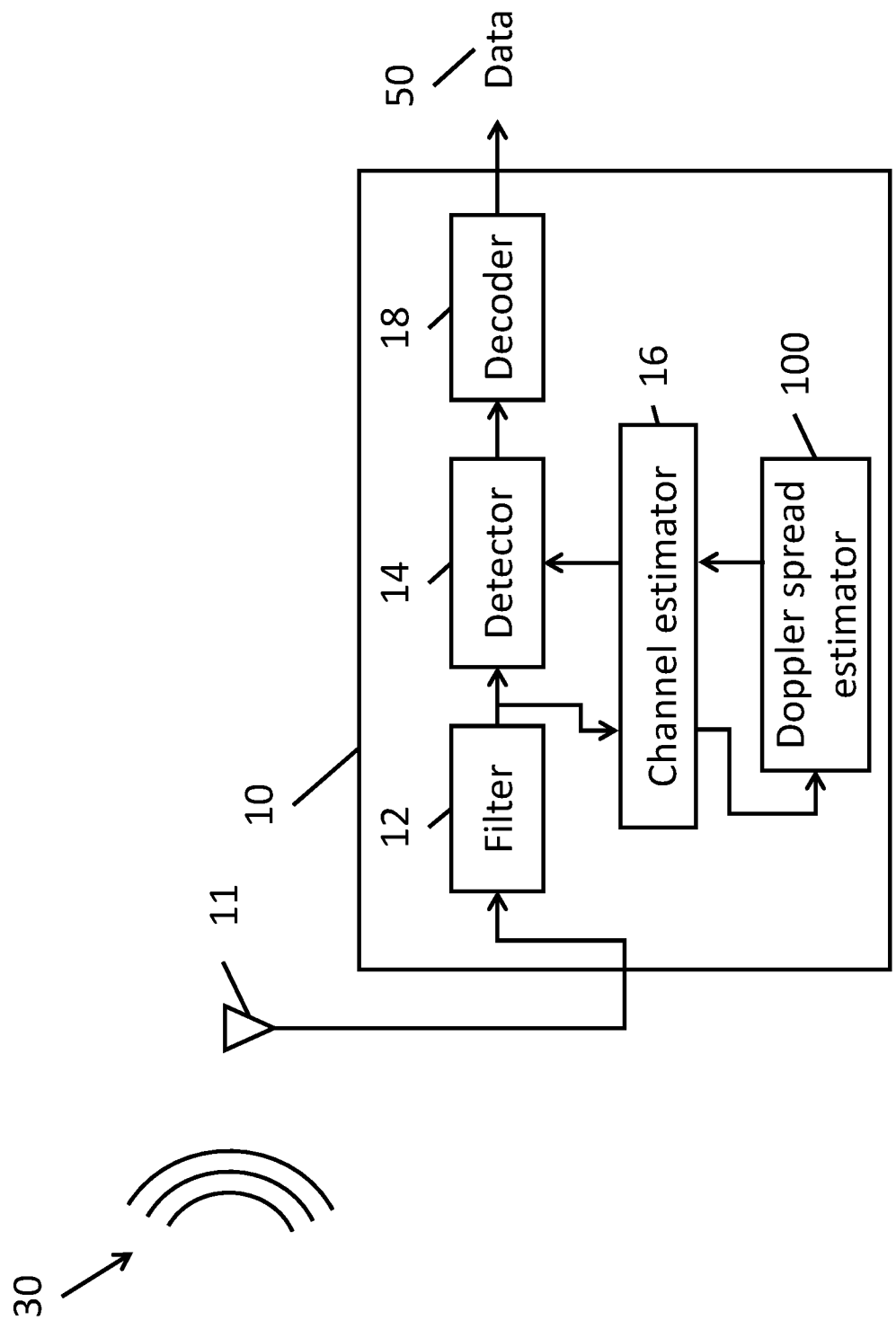
FIG. 1 is a schematic block diagram of a mobile station.

In the following detailed description, only certain exemplary embodiments of the present disclosure are shown and described, by way of illustration. As those skilled in the art would recognize, the disclosure may be embodied in many different forms and should not be construed as being limited to the embodiments set forth herein.

For the sake of clarity, aspects of embodiments of the present disclosure will be described herein in the context of a radio transceiver of a cellular modem. However, embodiments of the present disclosure are not limited thereto, and a person having ordinary skill in the art before the effective filing date of the present application would understand that embodiments of the present disclosure may also be applied to estimate Doppler spread in other contexts.

In some radio transmission standards, such as the 5G New Radio (NR) standard, a cellular radio transceiver may use a tracking reference signal (TRS) received from a base station to estimate the Doppler spread $D_s$. For example, one technique calculates an estimated channel correlation between channels corresponding to two tracking reference signals and then supplies the estimated channel correlation to an inverse Bessel function to obtain the Doppler spread $D_s$.

However, this approach assumes that the relationship between the channel correlations and the Doppler spread follows the inverse Bessel function. In practice, channels do not always exhibit an inverse Bessel function relationship between the channel correlations and the Doppler spread. In addition, when calculating the channel correlation, the noise power needs to be removed from the channel power, and therefore the accuracy of the estimation of the channel correlation is sensitive to the estimation of the noise variance. Furthermore, in some circumstances, there may only be one TRS slot (two TRS symbols) per TRS period, so only one correlation value may be available for Doppler estimation, thereby resulting in a low resolution of the Doppler estimation. For example, under the 5G NR standard, when operating at FR2 (Frequency Range 2, including frequency bands in the millimeter wave range of 24 GHz to 100 GHz), it is possible that only 1 TRS slot is transmitted per TRS period.

Accordingly, aspects of embodiments of the present disclosure relate to estimating Doppler spread using supervised machine learning. In more detail, some aspects of embodiments of the present disclosure relate to using supervised learning (e.g., using a machine learning model such as a multi-layer perceptron (MLP) neural network or other neural network) to learn a mapping function (or a "Doppler spread predictor") from the estimated channel correlation to the Doppler spread, where the mapping function is trained on collected experimental data relating channel correlations to Doppler spread. During online prediction, the estimated correlation is supplied to the learned mapping function (the Doppler spread predictor) to generate the estimated Doppler spread.

Mapping functions (or Doppler spread predictors) according to embodiments of the present disclosure are trained from the data collected from operational radio communications systems, and therefore match the actual behavior of these working systems, rather than relying on particular assumptions about the operating environment and the behavior of those systems. In addition, given a sufficiently large and diverse set of training data, trained Doppler spread predictors according to embodiments of the present disclosure are able to generalize and produce robust (e.g., accurate) estimates of Doppler spread over a range of different operating conditions, e.g., different signal-to-noise ratios (SNRs) spread over a training SNR range, thereby enabling embodiments of the present disclosure to compensate for noise variance. According to some aspects of embodiments of the present disclosure, the Doppler spread predictor also utilizes one or more prior estimated channel correlations (e.g., from prior TRS periods) to improve the estimate of the Doppler spread at the current TRS period.

FIG. 1 is a schematic block diagram of a mobile station. As shown in FIG. 1, a mobile station 10 may include an antenna 11 that is configured to receive an electromagnetic signal 30 (e.g., transmitted by a base station). The received signal may be supplied to a receive filter 12 (e.g., a band pass filter), and the filtered signal may be supplied to a detector 14 and a channel estimator 16. The channel estimator 16 may generate channel state information (CSI) that is used to control the detector 14, as well as to other components of the mobile station 10, to adapt to changing conditions in the environment, such as the movement of the mobile station 10 relative to the base station and/or changes in the environment through which the transmitted signal 30 propagates. According to some embodiments of the present disclosure, the channel estimator 16 communicates with or includes a Doppler spread estimator 100. The output of the channel estimator 16 (which may include the output of the Doppler spread estimator 100 or may include information computed based on the output of the Doppler spread estimator) is supplied to a detector 14 which uses the channel estimates to perform symbol detection. The decoder 18 may be configured to receive the detected symbols from the detector 14 and to decode the detected symbols into data 50, such as a digital bitstream, to be supplied for consumption by applications in the mobile station 10, such as voice calls, data packets, and the like. In various embodiments of the present disclosure, the components of the mobile station 10, such as the filter 12, the detector 14, the channel estimator 16, the Doppler spread estimator 100, and the decoder 18 may be implemented in one or more processing circuits (e.g., a radio baseband processor (BP or BPP), a central processing unit (CPU), a microcontroller, a digital signal processor (DSP), a field programmable gate array (FPGA), or an application specific integrated circuit (ASIC)) of a digital radio, where various portions of various blocks may be implemented in the same circuit (e.g., on the same die or in a same package) or in different circuits (e.g., on different dies or in different packages, connected over a communication bus).

Figure 2:
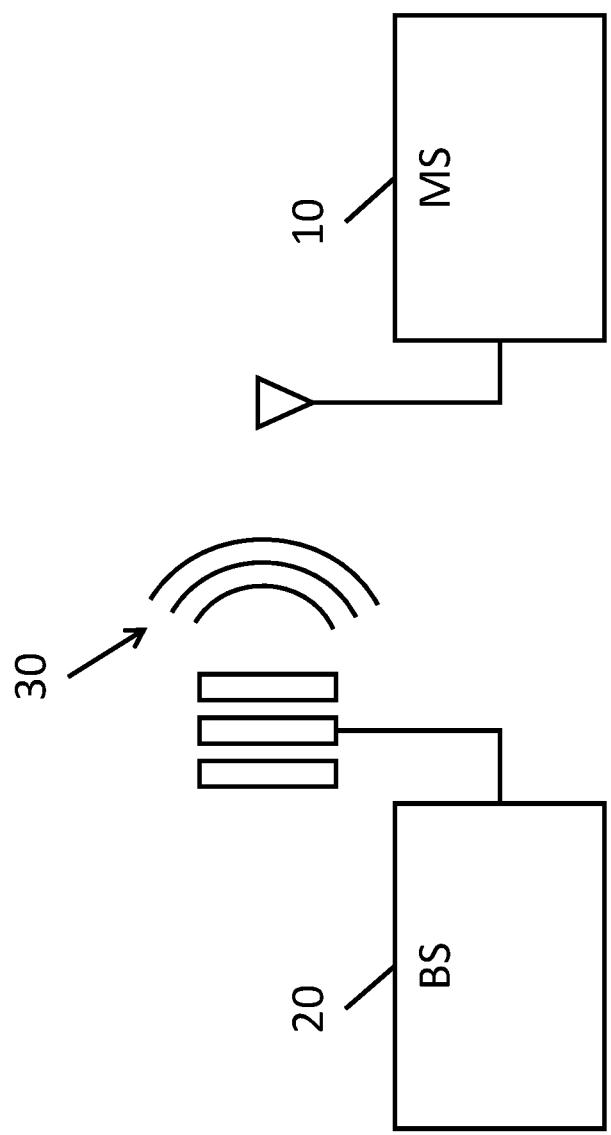
FIG. 2 is a schematic block diagram of a wireless communication system in which a base station transmits a signal to a mobile station.

FIG. 2 is a schematic block diagram of a communication system in which a base station 20 transmits a signal 30 to a mobile station 10, where the mobile station 10 includes a Doppler spread estimator 100. The magnitude of the Doppler shift in the signal received by the mobile station 10 may depend on the relative motion (e.g., velocity) of the mobile station 10 with respect to the base station 20, and therefore the Doppler spread in the received signal may also depend on the relative motion of the mobile station 10 with respect to the base station 20.

As noted above, some comparative systems compute a Doppler spread from estimated channel correlations using an inverse Bessel function based on an assumption that the channel statistics follow in accordance with Jakes' model. For example, based on Jakes' model, the channel autocorrelation function has the form of Equation 1:

$$R(\tau, f_d) = J_0(2\pi f_d \tau) \quad (1)$$

where $\tau$ denotes the time difference, and $f_d$ denotes the maximum Doppler shift, as defined below in Equation 2:

$$f_d = \frac{fv}{c} \quad (2)$$

where c denotes the speed of light, f denotes the frequency of the transmitted signal 30, and v is the velocity of the mobile station 10. Formally, the Doppler spread is defined as $D_s = f_d - (-f_d) = 2f_d$. As used herein, the term Doppler spread estimation is used interchangeably with maximum Doppler shift estimation, both denoting the estimation of $f_d$ above. The $J_0(\bullet)$ denotes the zeroth-order Bessel function of the first kind as shown in Equation 3:

$$J_0(x) := \frac{1}{\pi} \int_0^\pi e^{jx\cos\theta} d\theta \quad (3)$$

Note that the channel autocorrelation function $R(\tau, f_d)$, above, is derived based on assuming Jakes' channel model, therefore, Jakes' channel model is implicitly assumed when an inverse Bessel function is used to describe the relationship between the channel correlation and the Doppler shift $f_d$. This Jakes' channel model assumption may be valid for some types of channel models, such as an Extended Pedestrian A model (EPA), an Extended Vehicular A model (EVA), an Extended Typical Urban model (ETU), and Tapped Delay Line (TDL) models, but not valid for some other types of channel models, for example, Clustered Delay Line (CDL) models. In practice, an inverse Bessel function may not accurately describe the relationship between an estimated channel correlation and a Doppler spread due to, for example, non-ideal estimation of the channel correlation. For example, in practice, the number of reference signal elements may not be large enough to compute an accurate average for the channel correlation, or the noise variance calculation may be too inaccurate.

Figure 3:
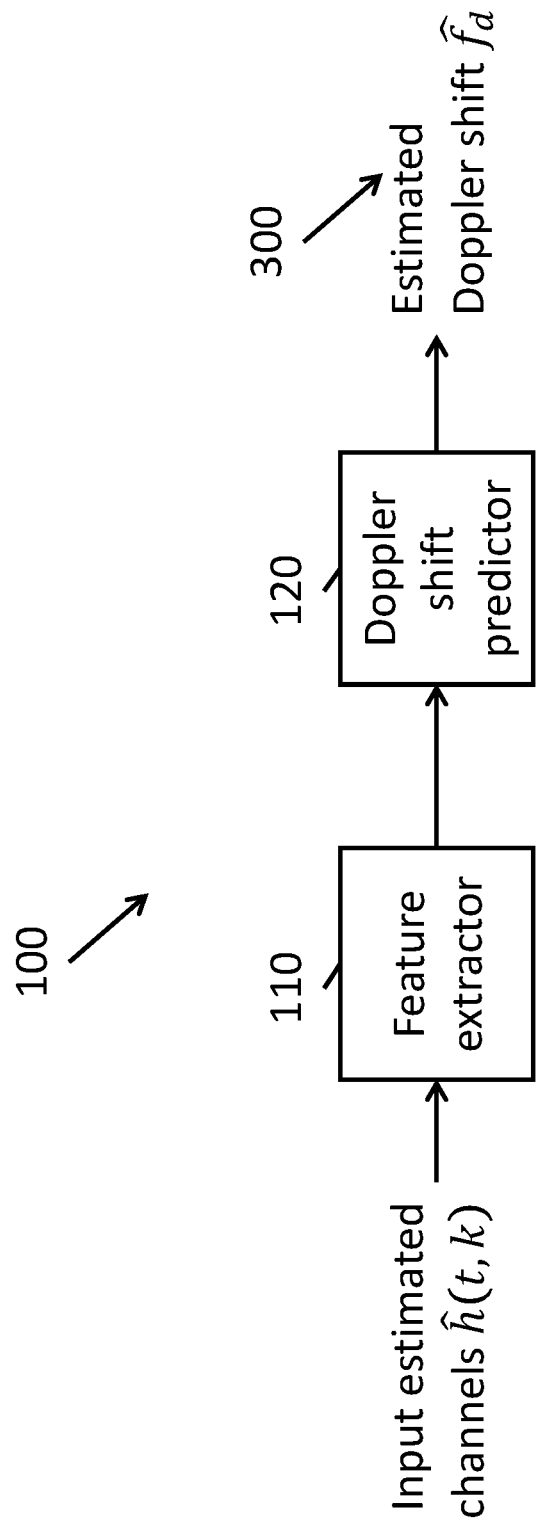
FIG. 3 is a block diagram of a Doppler spread predictor according to one embodiment of the present disclosure.

FIG. 3 is a block diagram of a Doppler spread estimator 100 according to one embodiment of the present disclosure. As shown in FIG. 3, according to one embodiment of the present disclosure, a Doppler spread estimator 100 is configured to receive input estimated channels. A feature extractor 110 is configured to extract features from the supplied channels, where the features may include, for example, estimated channel correlations. The extracted features are supplied to a trained Doppler shift predictor 120, which is configured to compute an estimated Doppler spread 300 value based on the extracted features. A trained Doppler shift predictor 120 according to embodiments of the present disclosure is constructed from training data collected from a real, physical system or practical link level simulator, and therefore can be trained to model the behavior of the system more accurately than an inverse Bessel function.

According to some embodiments of the present disclosure, a feature extractor 110 is configured to extract features from input estimated channels. The particular features include information decoded or computed from various characteristics of the input estimated channels. In some embodiments of the present disclosure, the feature extractor 110 is configured to extract channel correlations C(T) from the input estimated channels. These channel correlations can be computed based on the TRS signals of one or more TRS slots in the received signals. Generally, a channel correlation C(T) of an estimated channel $\hat{h}$ is given by Equation 4:

$$C(T) = \frac{E\{\hat{h}(t+T,k)\hat{h}^*(t,k)\}}{\frac{1}{2}E\{|\hat{h}(t+T,k)|^2 + |\hat{h}(t,k)|^2\} - \gamma \cdot \sigma^2} \quad (4)$$

where $\hat{h}(t, k)$ denotes the estimated channel at symbol time t and subcarrier k, $\sigma^2$ denotes the noise variance which is contained in the estimated channel, and $\gamma \in [0, 1]$ is a configurable parameter used to adjusted how much noise is subtracted. T denotes the time difference between two TRS symbols within a TRS slot or across two TRS slots. A channel correlation can be computed between the pair of TRS symbols within a given TRS slot or across two consecutive TRS slots if two TRS slots are allocated per TRS period.

In practice, it may be difficult to accurately estimate the noise variance $\sigma^2$, and it may also be difficult to choose an appropriate value for the noise subtraction parameter $\gamma$. According to some embodiments of the present disclosure, $\gamma$ is set to 0 (zero) to eliminate the effect of noise variance estimation. In addition, in some circumstances it is more practical to implement the expectation operation $E\{\cdot\}$ using a sample average. Accordingly, in some embodiments of the present disclosure, the channel correlation C(T) is implemented in accordance with Equation 5:

$$C(T) \triangleq \frac{\frac{1}{K}\Sigma_{k=1}^{K}\{\hat{h}(t+T,k)\hat{h}^*(t,k)\}}{\frac{1}{2} \cdot \frac{1}{K}\Sigma_{k=1}^{K}\{|\hat{h}(t+T,k)|^2 + |\hat{h}(t,k)|^2\}} \quad (5)$$

where K is the number of subcarriers.

In addition to computing current channel correlations based on the TRS symbols of the current TRS slot, the feature extractor 110 may also compute additional features. For example, in some embodiments of the present disclosure, the feature extractor 110 further computes features based on channel correlations estimated from previous TRS periods (e.g., the feature extractor 110 may include a memory that stores a window of channel correlations that were previously computed for earlier TRS periods).

According to some embodiments of the present disclosure, a Doppler spread predictor is trained based on actual measured data from an operational wireless communication system or from practical link level simulator. Accordingly, in some embodiments of the present disclosure, the training data may include data captured from transmissions between a transmitter and a receiver with a variety of different parameters, such as signal to noise ratio (SNR), channel (e.g., EPA, EVA, TDL-A, TDL-D), digital ports configuration (e.g., 1×2, 1×4, 1×8), analog antenna configuration (e.g., 2, 4, 8), Doppler shift $f_d$, modulation coding scheme (MCS), subcarrier spacing (SCS), and Fast Fourier Transform (FFT) size. For each particular combination of those parameters (e.g., for each particular set of transmission settings), training data is recorded during the transmission. Each sample in the training data includes an input and an output, where the input includes the features extracted by the feature extractor 110, and the output includes the Doppler shift $f_d$ under which the transmission happens (e.g., a measured Doppler shift $f_d$ in the case of an operational system or a configured Doppler shift $f_d$ in the case of a simulator). The final training data set contains a large amount of training data collected from transmissions under various combinations of different parameters.

The Doppler shift predictor 120 may include a neural network (e.g., a multi-layer perceptron (MLP), a recurrent neural network (RNN), a long short-term memory (LSTM) network, or the like) or other form of machine learning model. For the sake of illustration, embodiments of the present disclosure will be described in more detail with respect to the use of a multi-layer perceptron (MLP) as the machine learning model, but embodiments of the present disclosure are not limited thereto.

When applying supervised learning, a machine learning model is generally trained by adjusting a plurality of parameters of the model (e.g., weights of connections between neurons of a neural network) to minimize a cost function between a value computed by a model based on the inputs to the model (e.g., the features extracted by the feature extractor 110 from the input estimated channels $\hat{h}$) and the ground truth values (e.g., the measured or configured Doppler shift $f_d$ associated with the channels h). In the case of a neural network, the training process may include applying the backpropagation algorithm with gradient descent to iteratively update the parameters of the model to minimize the cost function.

The collected training data contains many data samples in pairs, where each pair contains some input, e.g., C(T) (or some other input features), and an output, the ground truth Doppler spread $f_d$. During the offline training of the Doppler shift predictor 120 (e.g., a multi-layer perceptron), the Doppler shift predictor 120 is trained to map the input (e.g., channel correlations C(T) extracted from the signal by the feature extractor 110) to the output (ground truth Doppler spread $f_d$). During online prediction (e.g., when the Doppler shift predictor 120 is deployed in a mobile station 10 for computing channel state information), the current channel correlations C(T) are calculated and input to the Doppler shift predictor 120 to compute an estimated Doppler spread $\hat{f}_d$.

In more detail, the Doppler spread estimation, when considered within the learning framework, can be formulated as a regression problem, at least because the estimated Doppler spread $f_d$ is a single, continuous value. Therefore, when treating the training of the Doppler spread predictor as a regression problem, the optimization process of training a machine learning model based on a regression model can be performed by minimizing sum-of-squares error with respect to the parameters θ as shown in Equation 6:

$$\min_\theta \frac{1}{N} \sum_{n=1}^{N} (F_\theta(g_n) - f_{d,n})^2 \quad (6)$$

where the Doppler spread prediction function can be denoted as $F_\theta$, θ represents the learned parameters of the Doppler spread prediction function, the input features as g, and the true Doppler spread as $f_d$. In the above, it is assumed that the training data set contains N input/output pairs $\{g_n, f_{d,n}\}$, n=1, ..., N.

However, the Doppler spread can span a wide range, possibly reaching thousands of hertz at FR2 (e.g., millimeter wave frequencies). Therefore, the estimated Doppler shift $f_d$ can also span a wide range, e.g., $f_d \in [0, 2000]$. If the training of the machine learning model is based on solving the above sum-of-squares error minimization function, then the training samples corresponding to small Doppler spread will be de-emphasized, because the error $(F_\theta(g_n)-f_{d,n})^2$ for small $f_{d,n}$ is, in general, smaller than the error $(F_\theta(g_n)-f_{d,n})^2$ for large $f_{d,n}$. This will cause very inaccurate Doppler spread estimations when the true Doppler spread is small.

Accordingly, in some embodiments of the present disclosure, the process of training a machine learning model based on a regression model may be performed by minimizing normalized sum-of-squares error with respect to the parameters θ as shown in Equation 7:

$$\min_\theta \frac{1}{N} \sum_{n=1}^{N} \left( \frac{F_\theta(g_n) - f_{d,n}}{f_{d,n}} \right)^2 \quad (7)$$

By using the above normalized sum-of-squares error as the cost function, the training samples corresponding to large Doppler spread will be de-emphasized, since the error $(F_\theta(g_n)-f_{d,n})^2$ is divided by $f_{d,n}^2$, so the cost for large $f_{d,n}$ is made smaller (e.g., the cost function is normalized with respect to $f_{d,n}$).

In some embodiments of the present disclosure, Doppler spread prediction is treated as a classification problem, instead of a regression problem, by quantizing the Doppler spread range into multiple small regions or ranges. Each region of Doppler spread is regarded as one class, and represented by a single Doppler spread (e.g., the median Doppler spread of the region). The Doppler spread predictor is then trained to map the input features g to a probability or confidence of each class (e.g., computing a plurality of probabilities, where each probability represents a confidence that the input features map to a corresponding one of the regions of Doppler spreads). In some embodiments, the final Doppler spread estimation is then calculated by combining the Doppler spread representing each class based on the probability of each class, as discussed in more detail below.

Table 1, below, presents one example of the division of a Doppler shift range into M different classes. In more detail, assuming the whole range of the Doppler shift of the training data is $f_d \in [r_0, r_M]$, the full range can be divided into M non-overlapping, contiguous regions, for a total of M classes. For example, the m-th region corresponds to a Doppler shift range $[r_{m-1}, r_m)$. Each class is represented by a corresponding Doppler shift $\bar{f}_m$ for m=1, ..., M, where $\bar{f}_m \in [r_{m-1}, r_m)$. When preparing the training data set, the Doppler shift (e.g., $f_{d,n}$) associated with each training data sample is binned into a corresponding one of the M regions (e.g., find an m-th region such that $f_{d,n} \in [r_{m-1}, r_m)$), such that this training sample will be categorized as class m. During training, the cross-entropy is used as the cost function.

TABLE 1

| Class index | Range of Doppler shift in each class | Representative corresponding Doppler shift |
|---|---|---|
| 1 | $[r_0, r_1)$ | $\bar{f}_1$ |
| 2 | $[r_1, r_2)$ | $\bar{f}_2$ |
| . | . | . |
| . | . | . |
| . | . | . |
| M | $[r_{M-1}, r_M]$ | $\bar{f}_M$ |

Given an input feature, a Doppler shift predictor trained as a classifier will output an M dimensional vector $[c_1, \ldots, c_M]^T$ satisfying $\sum_{m=1}^{M} c_m = 1$, where $c_m$ denotes the probability (or confidence) that the input feature belongs to the class m. The cost function can be represented as below, where the mapping function or Doppler shift predictor $F_\theta$ characterized by coefficients θ maps the input feature $g_n$ of the n-th training data sample to a M dimentional vector $[c_{n,1}, c_{n,2}, \ldots, c_{n,M}]$, the n-th training data belongs to the $v_n$ class such that $f_{d,n} \in [r_{v_n-1}, r_{v_n}]$ as shown in Equation 8:

$$\min_\theta -\frac{1}{N} \sum_{n=1}^{N} \log(c_{n,v_n}) \text{ s.t. } F_\theta(g_n) = [c_{n,1}, c_{n,2}, \ldots, c_{n,M}]^T, \quad (8)$$

$$f_{d,n} \in [r_{v_n-1}, r_{v_n}]$$

When performing inferences or predictions, the Doppler spread predictor, trained as a classifier, generates the predicted probability for each of the M classes $c_1, \ldots, c_M$. Given the representative Doppler spreads for each class $(\bar{f}_1, \ldots, \bar{f}_M)$, the final Doppler spread estimation can be obtained by either "mean combining," computed based on the sum of the products of each representative Doppler spread multiplied by its corresponding predicted probability as shown in Equation 9:

$$\hat{f}_d = \sum_{m=1}^{M} c_m \cdot \bar{f}_m \quad (9)$$

or "max combining," selecting the representative Doppler spread corresponding to the highest predicted probability as shown in Equation 10:

$$\hat{f}_d = \sum_{m=1}^{M} I(c_m = \max\{c_1, \ldots, c_M\}) \cdot \overline{f}_m \quad (10)$$

where I(•) denotes the indication function as shown in Equation 11:

$I(\text{True})=1$ $I(\text{False})=0 \quad (11)$

However, as noted above, in some embodiments of the present disclosure, γ is set to be 0 when the feature extractor 110 computes the estimated channel correlation C(T). Therefore, the estimated channel correlations C(T) computed by the feature extractor 110 may be smaller than the true channel correlations (because setting γ to zero in Equation 4 makes the denominator larger). The degree to which the estimated channel correlations C(T) are smaller than the true channel correlations is more pronounced at lower SNR (e.g., at lower SNR there is a greater difference between the estimated channel correlation and the true channel correlation). This is because a lower SNR corresponds to a larger noise variance $\sigma^2$, and therefore the lower the SNR, the larger the increase in the denominator due to setting the term $-\gamma \cdot \delta^2$ to zero (e.g., more noise variance $\delta^2$ should have been subtracted from the estimated channel power in the denominator, but setting γ=0 causes the denominator to be even larger). As a result, if the operating SNR during online prediction is different from the SNR of the training data set, the estimated channel correlation C(T) during online prediction will be different from the C(T) for the training set, even for the same true Doppler spread $f_d$. In other words, the mapping function learned based on the offline training data may not be suitable for online prediction, due to the mismatch between the SNR during operation and the SNR of offline training data set.

Figure 4:
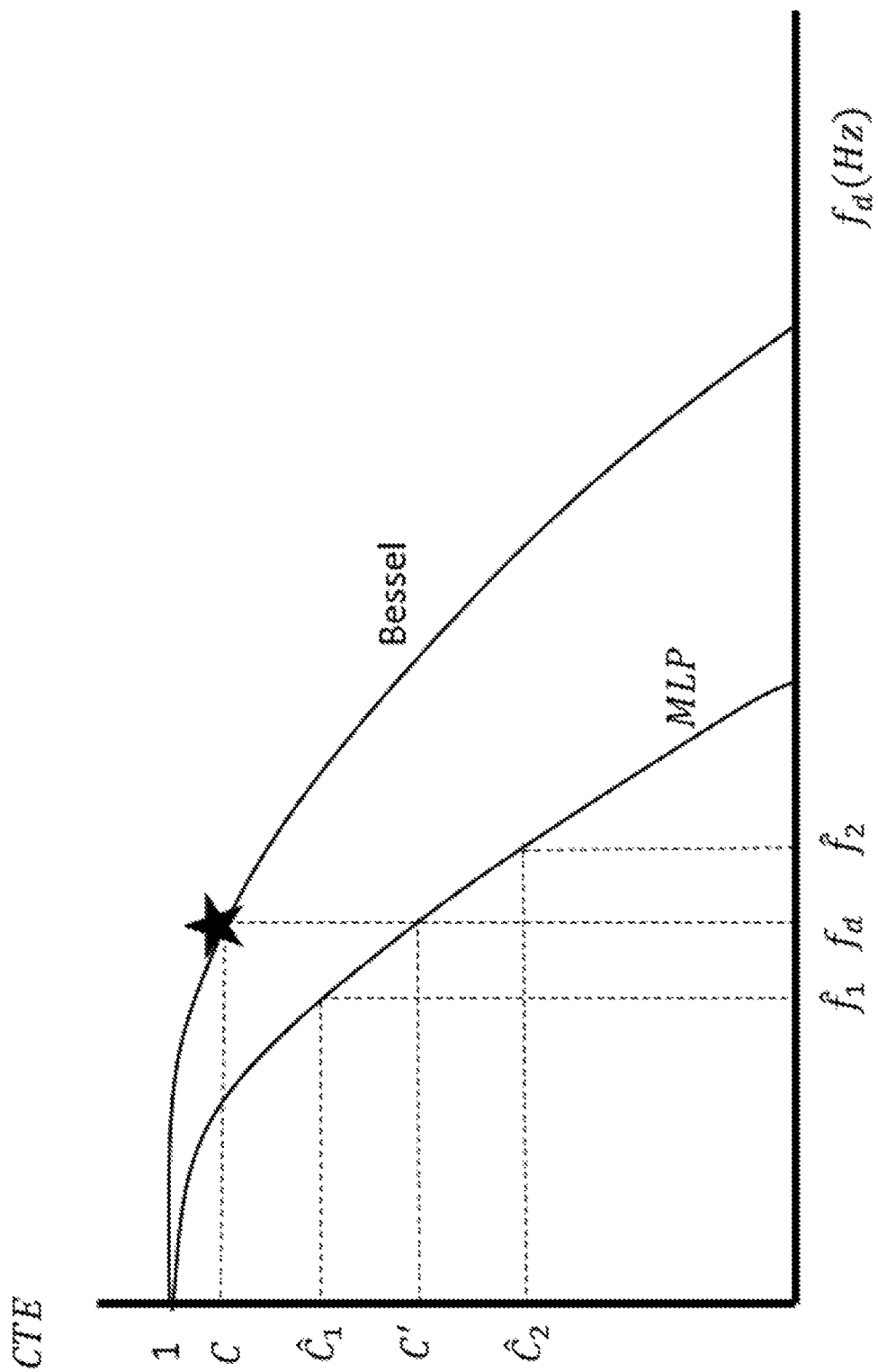
FIG. 4 is a graph comparing a relationship between channel correlations C(T) and Doppler shift $f_d$ when using a Bessel function versus using a multi-layer perception (MLP) according to embodiments of the present disclosure as a mapping function.

FIG. 4 is a graph showing a relationship between channel correlations C(T) and Doppler shift $f_d$ when using a Bessel function or a multi-layer perception (MLP) according to embodiments of the present disclosure as a mapping function. Referring to FIG. 4, assuming the MLP is learned from a set of training data such that the channel correlation corresponding to a Doppler shift of $f_d$ is C'. Then, during online estimation, if the operating SNR is higher than the SNR range of training data set, the estimated channel correlation, denoted as $\hat{C}_1$, will be larger than C'. As a result, the estimated Doppler shift, denoted as $\hat{f}_1$, will be smaller than the true Doppler shift $f_d$. On the other hand, if the operating SNR is lower than the SNR range of the training data set, the estimated channel correlation, denoted as $\hat{C}_2$, will be smaller than C', and the corresponding estimated Doppler shift, denoted as $\hat{f}_2$, will be larger than the true Doppler shift $f_d$. As shown in FIG. 4, due to the mismatch between the SNR of the training data set and the online prediction, the estimated Doppler shift, e.g., $\hat{f}_1$ and $\hat{f}_2$, can deviate from the true $f_d$. Accordingly, the predicted estimated Doppler shift $\hat{f}_d$ computed by the Doppler shift predictor 120 is more accurate when the actual SNR is close to the SNR of the data that was used to train the Doppler shift predictor 120.

In practice, the operating SNR range of a wireless transceiver can be broad, and it may be difficult to train a single Doppler shift predictor that can operate over the entire operating SNR. Accordingly, in some embodiments of the preset disclosure, the training data is divided into multiple subsets (e.g., R subsets or sub-ranges), each subset corresponding to a different part of the entire SNR range of the training data (or the training SNR range), and each subset or sub-range of the training data is used to train a separate Doppler shift predictor $P_r$ (e.g., in a manner substantially similar to that discussed above) for that corresponding r-th portion of the operating SNR range (each Doppler shift predictor may have the same architecture or a different architecture).

In some embodiments of the present disclosure, each subset is the same size or may otherwise be evenly spaced, in linear scale or logarithmic scale, along the training SNR range of the training data. In other embodiments of the present disclosure, the subsets are of different sizes (e.g., not evenly spaced along the training SNR range). For example, the training data may be divided into subsets such that there are more predictors trained to provide predicted Doppler shifts for portions of the operating SNR range that are more frequently observed in practice (e.g., so that the Doppler shift estimator produces more accurate results more often). As another example, the training data may be divided into subsets such that there are more predictors in regions of the operating SNR range that are more sensitive to inaccuracy in estimated Doppler shift or estimated Doppler spread.

Figure 5:
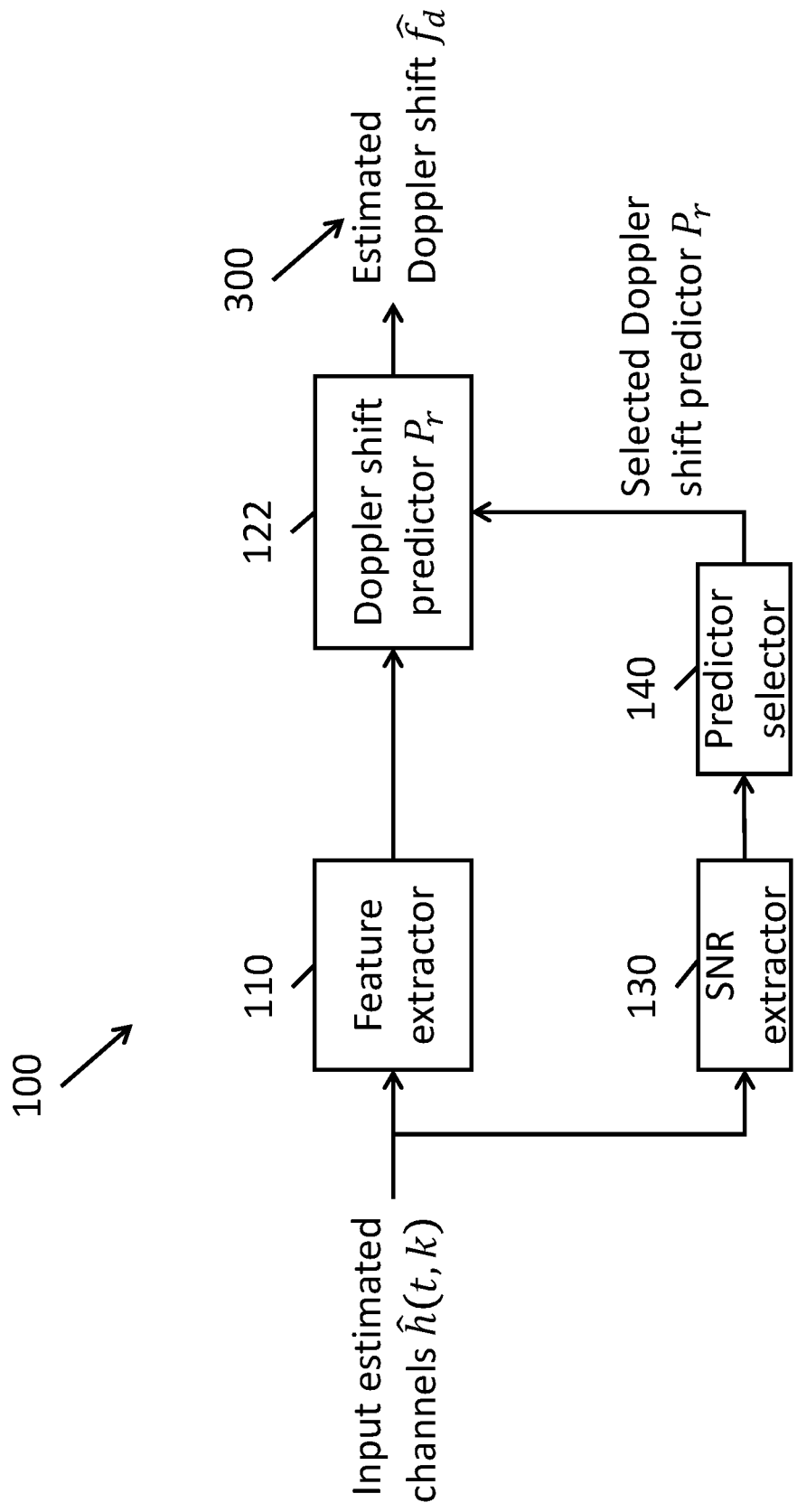
FIG. 5 is a block diagram of a Doppler shift estimator according to one embodiment of the present disclosure.
Figure 6:
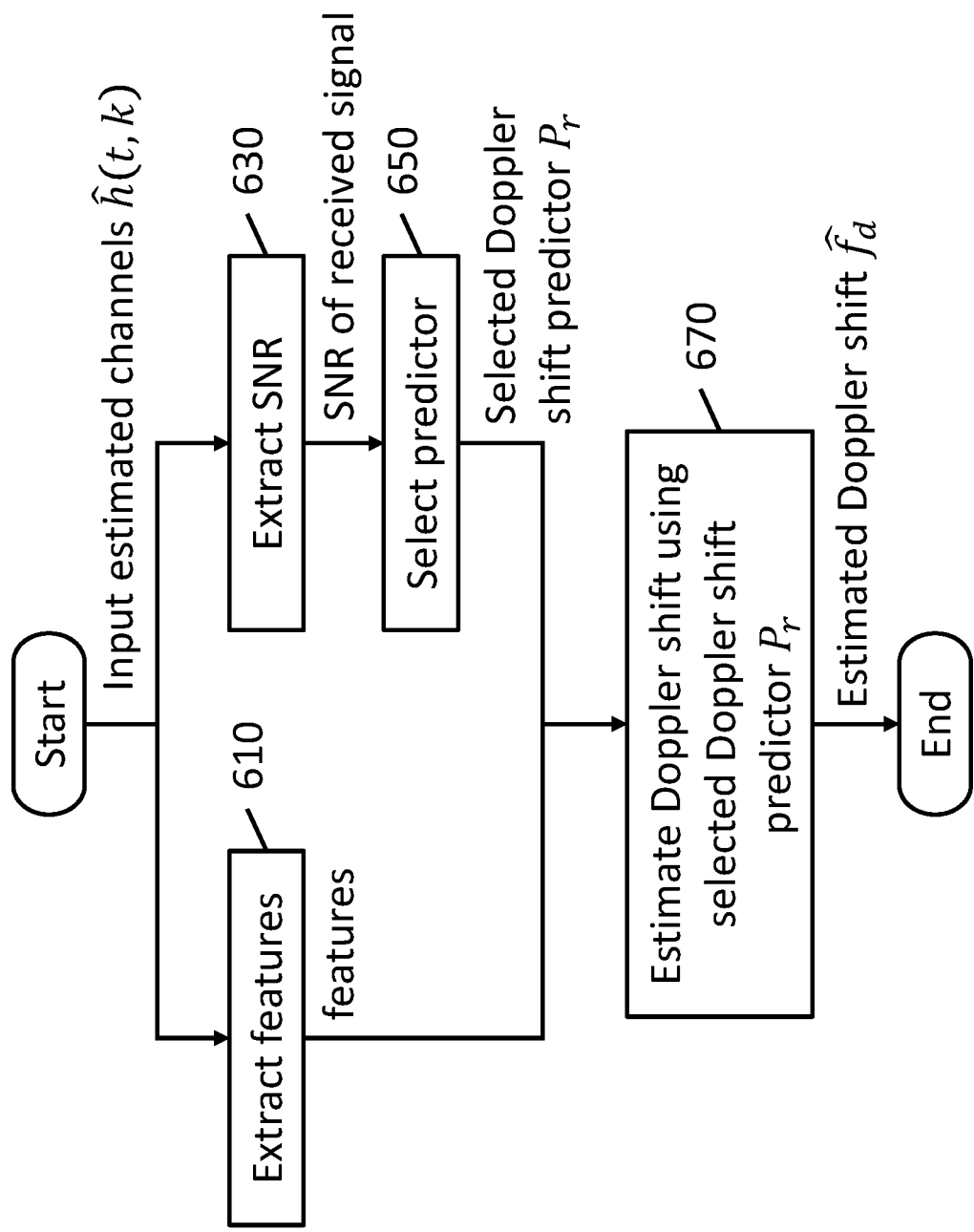
FIG. 6 is a flowchart depicting a method for estimating a Doppler spread using one or more Doppler shift predictors according to one embodiment of the present disclosure.

FIG. 5 is a block diagram of a Doppler spread estimator 100 according to one embodiment of the present disclosure. The Doppler spread estimator 100 of FIG. 5 is substantially similar to the Doppler shift estimator shown in FIG. 3, but further includes a signal-to-noise (SNR) extractor 130 and a predictor selector 140. FIG. 6 is a flowchart depicting a method for estimating a Doppler spread using a plurality of Doppler shift predictors according to one embodiment of the present disclosure. Referring to FIG. 6, in operation 610, the feature extractor 110 extracts features from the input estimated channels ĥ(t, k), as described above, and as described in more detail below. In operation 630, the SNR extractor 130 extracts the SNR of the received signal, and supplies the extracted SNR of the signal to the predictor selector 140, which is configured to select a particular Doppler shift predictor $P_r$ from among the R trained Doppler shift predictors P (e.g., Doppler shift predictors $P_1$, $P_2$, ..., $P_R$). For example, the training SNR range for each Doppler shift predictor P can be set as in Table 2, below:

TABLE 2

| Predictor index | Available SNR range for training |
| --- | --- |
| $P_1$ | [$snr_1$, $snr_2$] |
| $P_2$ | [$snr_2$, $snr_3$] |
| . | . |
| . | . |
| . | . |
| $P_R$ | [$snr_R$, ∞] |

Generally, more accurate channel state information (CSI) results in higher performance of the radio receiver, as the more accurate CIS allows the radio to tune its parameters to match the actual conditions of the channel. Nevertheless, channel estimators may over-estimate or under-estimate various parameters of the CIS, including the Doppler spread, due to various environmental conditions.

Based on experimental observations, over-estimation of Doppler spread results in better block error rate (BLER)

performance (e.g., lower error rates) than under-estimation of Doppler spread. In some experiments, when the true Doppler shift was 900 Hz, the BLER performance of setting the estimated Doppler shift to be 25% higher (1.25*900 Hz=1,125 Hz) had slightly better performance than the true $f_d$, whereas setting the estimated Doppler shift to be 25% lower (0.75*900 Hz=675 Hz) resulted in higher error rates.

In addition, as shown in FIG. 4, when the operating SNR is lower than the SNR range of the training data set (corresponding to the estimated channel correlation $\hat{C}_2$), the estimated Doppler spread $\hat{f}_2$ will be larger than the true Doppler spread $f_d$. In other words, a Doppler spread predictor that is trained on data having a higher SNR than the SNR of the supplied input channels will result in an over-estimate of the Doppler spread.

Therefore, in some embodiments of the present disclosure, the predictor selector 140 of a Doppler spread estimator 100 selects a Doppler shift predictor 122 that is biased toward over-estimation of (or over-estimating) the Doppler spread and away from under-estimation of (or under-estimating) the Doppler spread in order to improve the BLER performance of the radio. In some embodiments, the bias is implemented by selecting a Doppler shift predictor from among the R Doppler shift predictors that is trained on a portion of the training data set with an SNR range that is adjacent to and higher than the current operating SNR, as determined by the SNR extractor 130 (e.g., the next SNR range having a lower bound that is higher than the current estimated SNR).

Figure 7A:
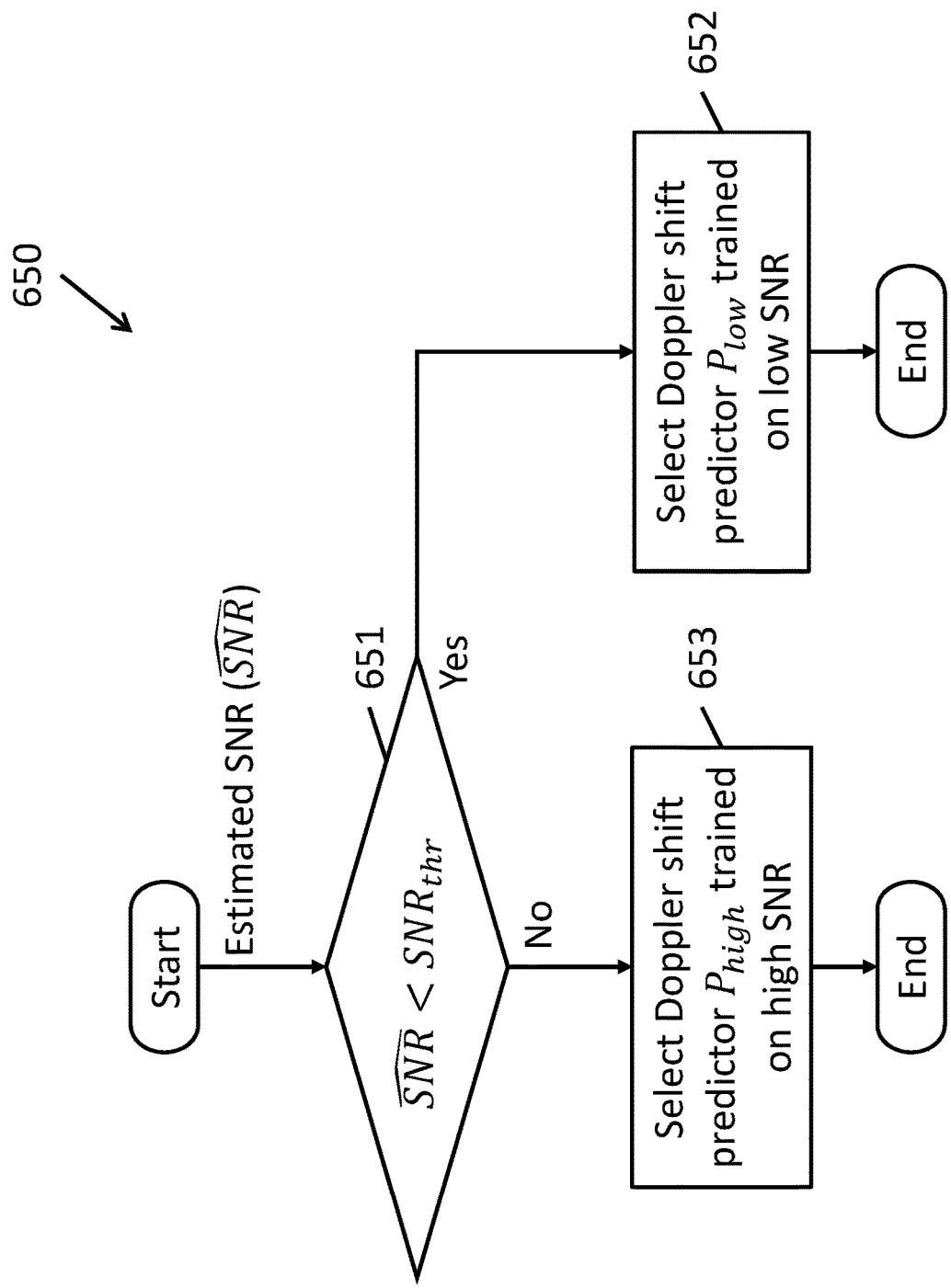
FIG. 7A is a flowchart depicting a method, according to one embodiment of the present disclosure, for selecting between two different Doppler shift predictors.

FIG. 7A is a flowchart depicting a method 650, according to one embodiment of the present disclosure, for selecting between two different Doppler shift predictors. FIG. 7A corresponds to a case where R=2, where a first Doppler shift predictor $P_{low}$ is trained on low SNR data (e.g., a portion of the data that was collected with low SNR signals in a range [$snr_1$, $snr_2$]) and a second Doppler shift predictor $P_{high}$ is trained on high SNR data (e.g., a portion of the data that was collected with high SNR signals in a range [$snr_2$, $snr_3$]). It is assumed that the operating SNR range for the radio is less than the lower end of the SNR range for the second Doppler shift predictor $P_{high}$ trained on the high SNR range (e.g., $snr_2$). Accordingly, referring to FIG. 7A, in operation 651, the predictor selector 140 determines if the current estimated SNR ($\widehat{SNR}$) is less than a threshold SNR ($SNR_{thr}$). Based on the example ranges given above, in some embodiments $SNR_{thr}=snr_1$, in other words, the threshold SNR is the lower end of the SNR range of the predictor trained with low SNR signals. When the current estimated SNR ($\widehat{SNR}$) is less than a threshold SNR ($SNR_{thr}$), then, in operation 652, the predictor selector 140 selects the first Doppler shift predictor $P_{low}$ that is trained on the low SNR data (because this is the predictor trained on data that is the closest to the current estimated SNR while also being trained on data with SNR higher than the current estimated SNR). When the current estimated SNR ($\widehat{SNR}$) is not less than the threshold SNR ($SNR_{thr}$) (e.g., greater than or equal to the threshold SNR $SNR_{thr}$), then, in operation 653, the predictor selector 140 selects the second Doppler shift predictor $P_{high}$ trained on high SNR.

Figure 7B:
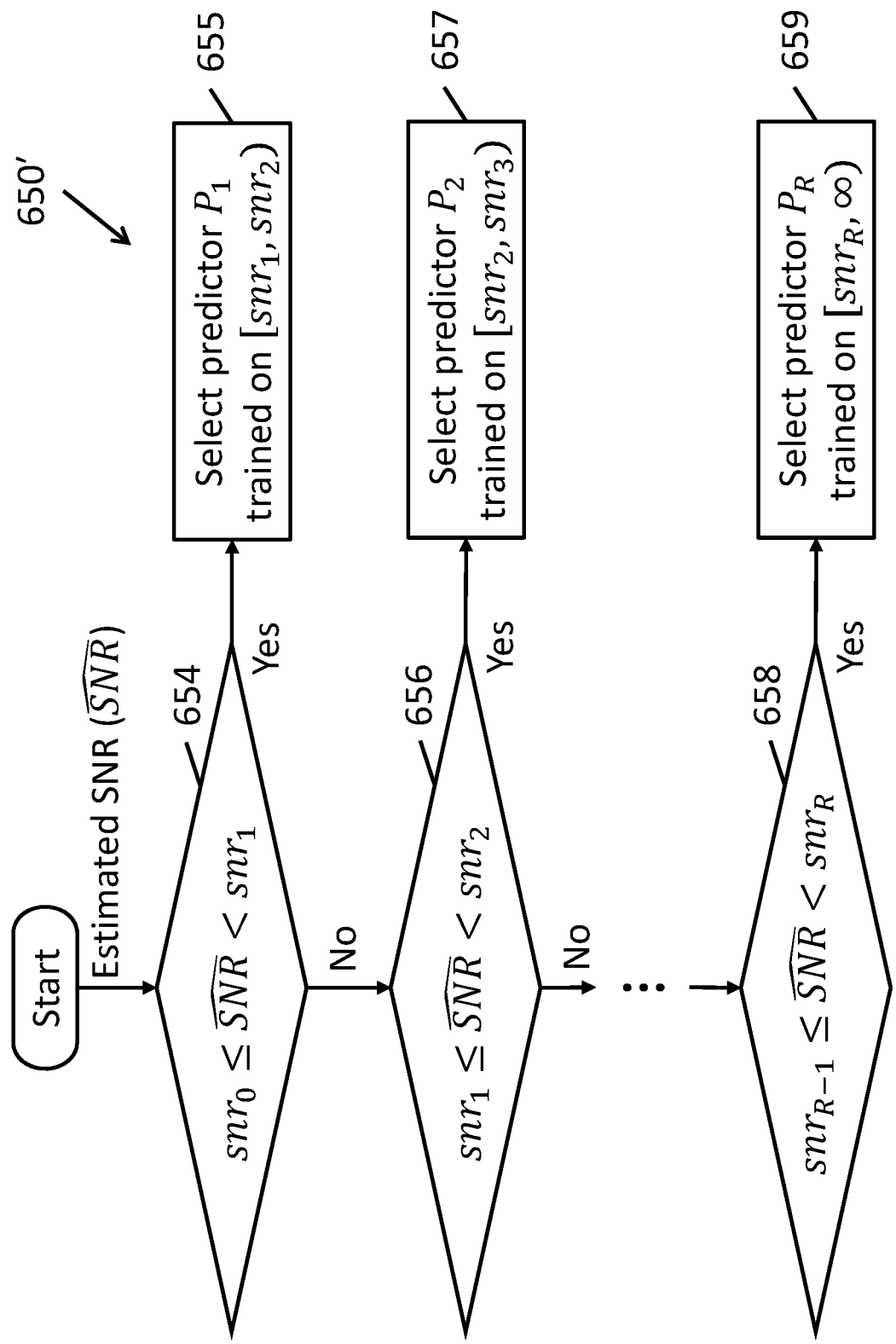
FIG. 7B is a flowchart depicting a method, according to one embodiment of the present disclosure, for selecting between one or more different Doppler shift predictors.

FIG. 7B is a flowchart depicting a method 650', according to one embodiment of the present disclosure, for selecting between a plurality of different Doppler shift predictors (e.g., R different Doppler shift predictors). As noted above, it is assumed that the operating SNR range of the system (e.g., the radio receiver) is from $snr_0$ to $snr_R$, and that the full operating SNR range is divided into R regions. In operation 654, the predictor selector 140 determines whether the current estimated SNR (SNR) is within a first SNR range ([$snr_0$, $snr_1$) or whether $snr_0 \leq \widehat{SNR} \leq snr_1$). If so, then, in operation 655, the predictor selector 140 selects the first predictor $P_1$, which was trained based on training data from a second SNR range [$snr_1$, $snr_2$) adjacent to and higher than the first SNR range [$snr_0$, $snr_1$). If the current estimated SNR ($\widehat{SNR}$) is not within the first SNR range ([$snr_0$, $snr_1$), then, in operation 656, the predictor selector 140 determines whether the current estimated SNR ($\widehat{SNR}$) falls within the second SNR range [$snr_1$, $snr_2$). If so, then, in operation 657, the predictor selector 140 selects the second predictor $P_2$, which was trained based on training data from a third SNR range [$snr_2$, $snr_3$) adjacent to and higher than the second SNR range [$snr_1$, $snr_2$). To summarize, if the current estimated SNR ($\widehat{SNR}$) is not within the first SNR range ([$snr_0$, $snr_1$), then the predictor selector 140 proceeds, in a similar manner, by comparing the current estimated SNR ($\widehat{SNR}$) against each of the remaining ones of the R regions of the operating SNR range to select a corresponding one of the predictors, the last SNR range being [$snr_{R-1}$, $snr_R$) in operation 658, and the last Doppler shift predictor $P_R$ (trained based on training data from the last SNR range [$snr_R$, $snr_\infty$)) being selected in operation 659. As noted above, it is assumed that the operating range is from $snr_0$ to $snr_R$, and therefore a SNR greater than $snr_R$ will not be observed or will be out of operating specification.

Referring back to FIGS. 5 and 6, after the predictor selector 140 has selected a predictor in operation 650, the selected Doppler shift predictor $P_r$ is used, in operation 670, to estimate a Doppler shift in operation 670 to compute an estimated Doppler shift $\hat{f}_d$. As noted above, in some embodiments, the estimated Doppler spread $\widehat{D}_s$ is related to a maximum estimated Doppler shift $\hat{f}_d$ in accordance with $\widehat{D}_s=2\hat{f}_d$. Accordingly, aspects of embodiments of the present disclosure relate to a Doppler spread estimator 100 capable of estimating Doppler shifts based on input features extracted from input estimated channels $\hat{h}(t, k)$.

In some embodiments of the present disclosure, a single estimated Doppler shift (or Doppler spread) is estimated by combining the predictions made by a plurality of Doppler shift predictors trained based on training data from a different part of the Doppler shift range (in contrast to being trained on different parts of the SNR range, as in the case of the embodiments described above with respect to FIGS. 5, 6, 7A, and 7B). For example, the training data, as described above, may be divided into R different subsets by dividing the full Doppler shift range into R different subranges, where each subset of the training data includes data from a corresponding one of the different subranges of the Doppler shift range. For example, the training Doppler shift range for each Doppler shift predictor P can be set as in Table 3, below:

TABLE 3

| Predictor index | Available Doppler shift range for training | Output |
|---|---|---|
| $P_1$ | [$f_{d1}$, $f_{d2}$] | $f_1$ |
| $P_2$ | [$f_{d2}$, $f_{d3}$] | $f_2$ |
| . | . | . |
| . | . | . |
| . | . | . |
| $P_R$ | [$f_{dR}$, ∞] | $f_R$ |

As shown in Table 3, each of the R Doppler shift predictors is configured to compute a corresponding output Doppler shift f' based on the input features. For example, an r-th predictor $P_r$ computes a predicted Doppler shift $f_r'$ from within its corresponding training Doppler shift range (e.g., where $f_r' \in [f_{dr}, f_{d(r+1)}]$). While Table 3 shows an embodiment in which the Doppler shift subranges are non-overlapping, embodiments of the present disclosure are not limited thereto. For example, in some embodiments, adjacent Doppler shift subranges corresponding to adjacent predictors have some overlap (e.g., predictor $P_1$ may be trained on data from range $[f_{d1a}, f_{d1b}]$ and predictor $P_2$ may be trained on data from range $[f_{d2a}, f_{d2b}]$, where $f_{d2a} < f_{d1b}$).

Figure 8:
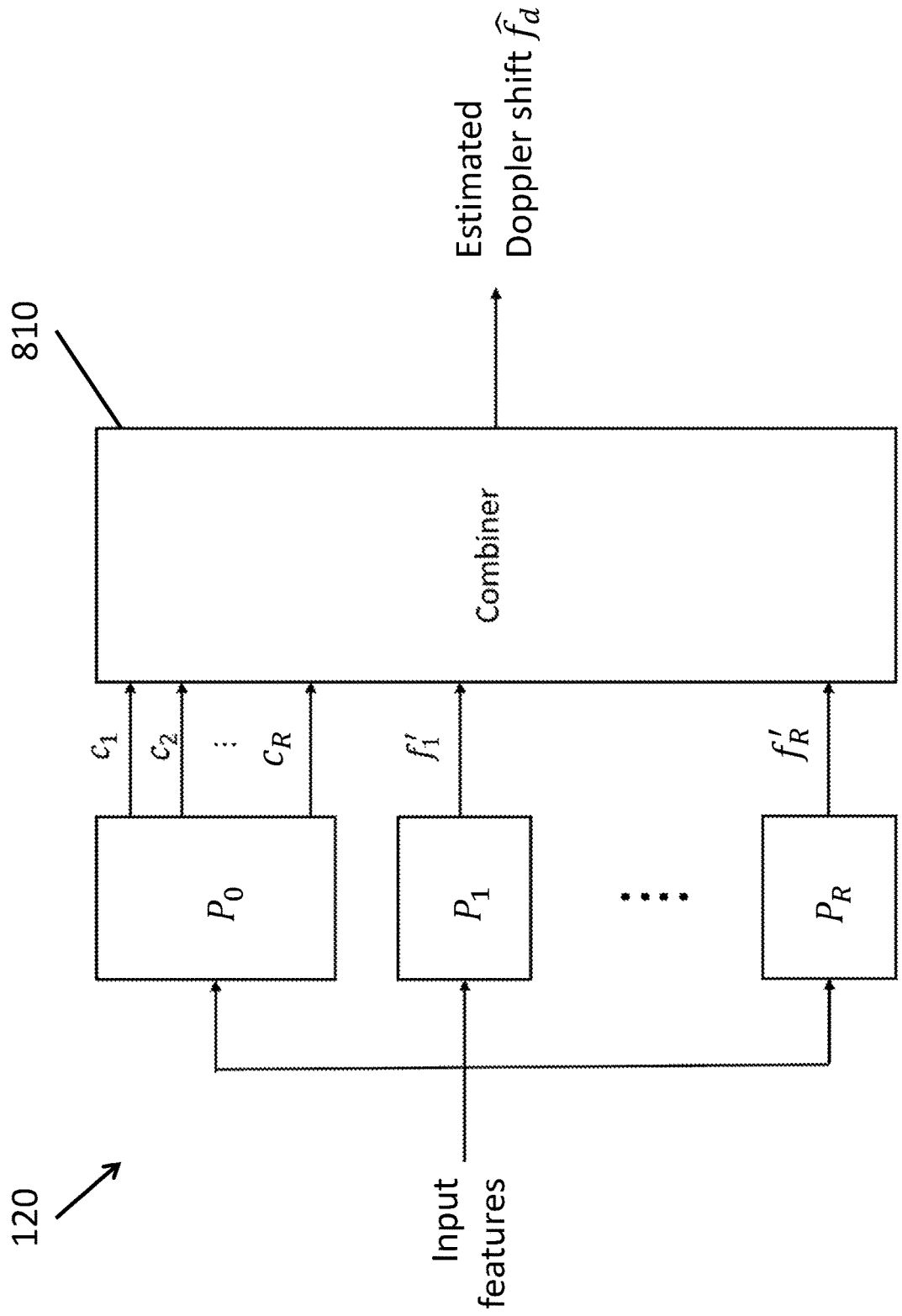
FIG. 8 is a block diagram of a Doppler shift estimator according to one embodiment of the present disclosure configured to estimate a Doppler shift by combining predictions from one or more Doppler shift predictors.

FIG. 8 is a block diagram of a Doppler shift estimator according to one embodiment of the present disclosure configured to estimate a Doppler shift by combining predictions from a plurality of Doppler shift predictors trained on different parts of the Doppler shift range. In the embodiment shown in FIG. 8, the Doppler shift predictor 120 includes R trained Doppler shift predictors. The input features are supplied to each of the R trained Doppler shift predictors to compute R predicted Doppler shifts $f_1', \ldots f_R'$. In addition, the input features are supplied to a Doppler shift predictor classifier network (or Doppler shift classifier network) $P_0$, which is trained to compute probabilities that the input features belong to each of the R classes (e.g., compute the probabilities of the input features falling into each of the R subranges of the Doppler shifts or predict which of the R Doppler shift predictors will predict the most accurate Doppler shift for the given input features). The output of the classification-based network $P_0$ is a R dimensional vector $[c_1, \ldots, c_R]$, where each value $c_r$ denotes a probability or confidence that the input features correspond to the r-th class (e.g. correspond to the r-th Doppler shift predictor). The outputs of the R Doppler shift predictors are then combined by the combiner 810 using, for example, mean combining, computed based on the sum of the products of each predicted Doppler shift f' multiplied by its corresponding predicted probability as shown in Equation 12:

$$\hat{f}_d = \sum_{r=1}^{R} c_r \cdot f_r' \quad (12)$$

or by using max combining, selecting the predicted Doppler shift corresponding to the highest predicted probability as shown in Equation 13:

$$\hat{f}_d = \sum_{r=1}^{R} I(c_r = \max\{c_1, \ldots, c_R\}) \cdot f_r' \quad (13)$$

where I(•) denotes the indication function.

Figure 9:
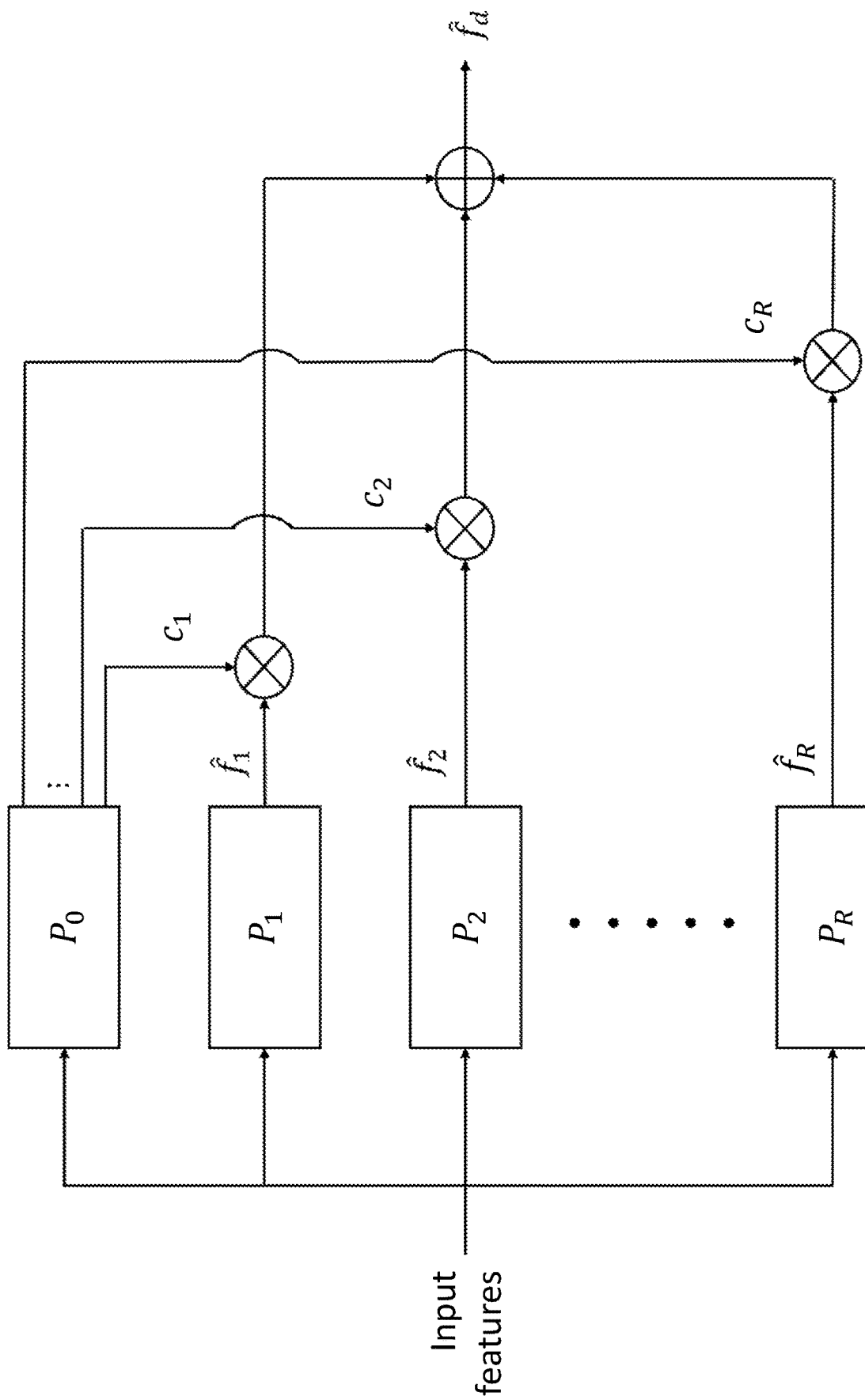
FIG. 9 is a block diagram of a Doppler shift estimator according to one embodiment of the present disclosure configured to estimate a Doppler shift by combining predictions from one or more Doppler shift predictors in accordance with confidences in the Doppler shift predictors.

FIG. 9 is a block diagram of a Doppler shift estimator according to one embodiment of the present disclosure configured to estimate a Doppler shift by combining predictions from a plurality of Doppler shift predictors using mean combining. As shown in FIG. 9, the R predicted Doppler shifts $f_1', f_2', \ldots, f_R'$ are multiplied by their corresponding probabilities or confidences $c_1, c_2, \ldots, c_R$, and the products are summed to compute the estimated Doppler shift $\hat{f}_d$.

As noted above, the input features extracted from the input estimated channels may include current channel correlations C(T), as computed based on the channels $\hat{h}(t,k)$ estimated from received TRS symbols.

As discussed above, in comparative systems for estimating a Doppler spread, an estimated channel correlation is supplied to an inverse Bessel function to obtain the estimated Doppler spread. In practice, to obtain a more stable estimation of the channel correlation C(T), an infinite impulse response (IIR) filter is applied over the channel correlation estimated in each TRS period, leading to an IIR-filtered channel correlation. Because the channel correlation directly measures the change of the channel h, in some embodiments of the present disclosure, the IIR filtered channel correlation $\overline{C}_n(T)$ is supplied as an input feature to the Doppler shift predictor P (e.g., a currently selected one of a plurality of Doppler shift predictors).

Figure 10:
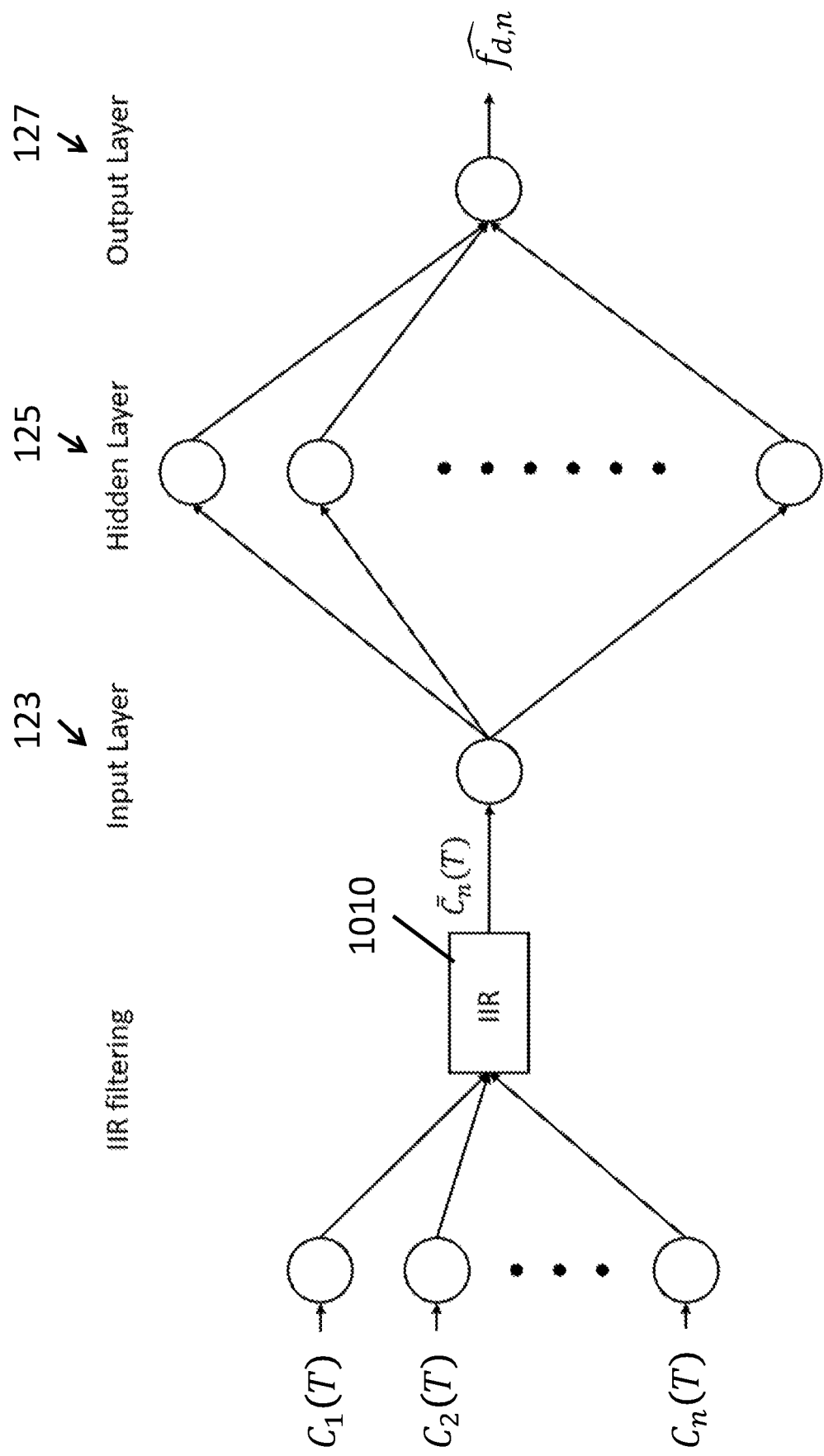
FIG. 10 is a schematic depiction of a Doppler shift predictor according to one embodiment of the present disclosure using an infinite impulse response (IIR) filter to combine one or more channel correlations.

Similarly, an IIR filter can be applied to stabilize the estimated channel correlation, so the final input feature to the Doppler shift predictor is only one value—the IIR-filtered estimated channel correlation. In some embodiments of the present disclosure, the Doppler shift predictor is a multi-layer perceptron (MLP). FIG. 10 is a schematic depiction of a Doppler shift predictor according to one embodiment of the present disclosure using an infinite impulse response (IIR) filter to combine a plurality of channel correlations. For example, as shown in FIG. 10, assume the current TRS period is the n-th TRS period, then there are n estimated channel correlations $C_1(T), C_2(T), \ldots, C_n(T)$ supplied as inputs to an infinite impulse response (IIR) filter 1010, then the IIR filtered channel correlation of these n input channel correlations may be denoted as $\overline{C}_n(T)$. In the embodiment of FIG. 10, the Doppler shift predictor is implemented as a multi-layer perceptron configured to perform regression, where the MLP has an input layer 123 with a single node configured to receive the input IIR filtered channel correlation $\overline{C}_n(T)$ and to supply the filtered channel correlations to a hidden layer 125 having a plurality of nodes in association with a plurality of weights (or parameters). At each node, the input IIR filtered channel correlation $\overline{C}_n(T)$ is multiplied by the corresponding weight, and the product is passed through an activation function (e.g., a sigmoid function or a rectified linear unit (ReLU)). An output layer 127 having a single node configured to receive and combine inputs from the plurality of nodes of the hidden layer (e.g., multiply the outputs of the activation function of the nodes of the hidden layer with weights, sum the results and pass through an activation function to compute a predicted Doppler shift $f_{d,n}$.

Because the IIR filter coefficient is set to be a fixed value, the way in which the feature extractor 110 combines the previous estimated channel correlation and the current estimated channel correlation is fixed at the time of designing the feature extractor 110, and may not be able to adapt to changing conditions or other factors. Furthermore, although the channel correlation is estimated in each TRS period, in this arrangement the final input to the Doppler shift predictor is only one IIR-filtered channel correlation, and therefore some information which may be contained in the previous estimated channel correlation is lost.

Accordingly, some aspects of embodiments of the present disclosure relate to supplying, as input features to the Doppler shift predictor, the current estimated channel correlation $C_n(T)$ as well as the channel correlations from a window of a plurality of previous TRS periods.

Figure 11:
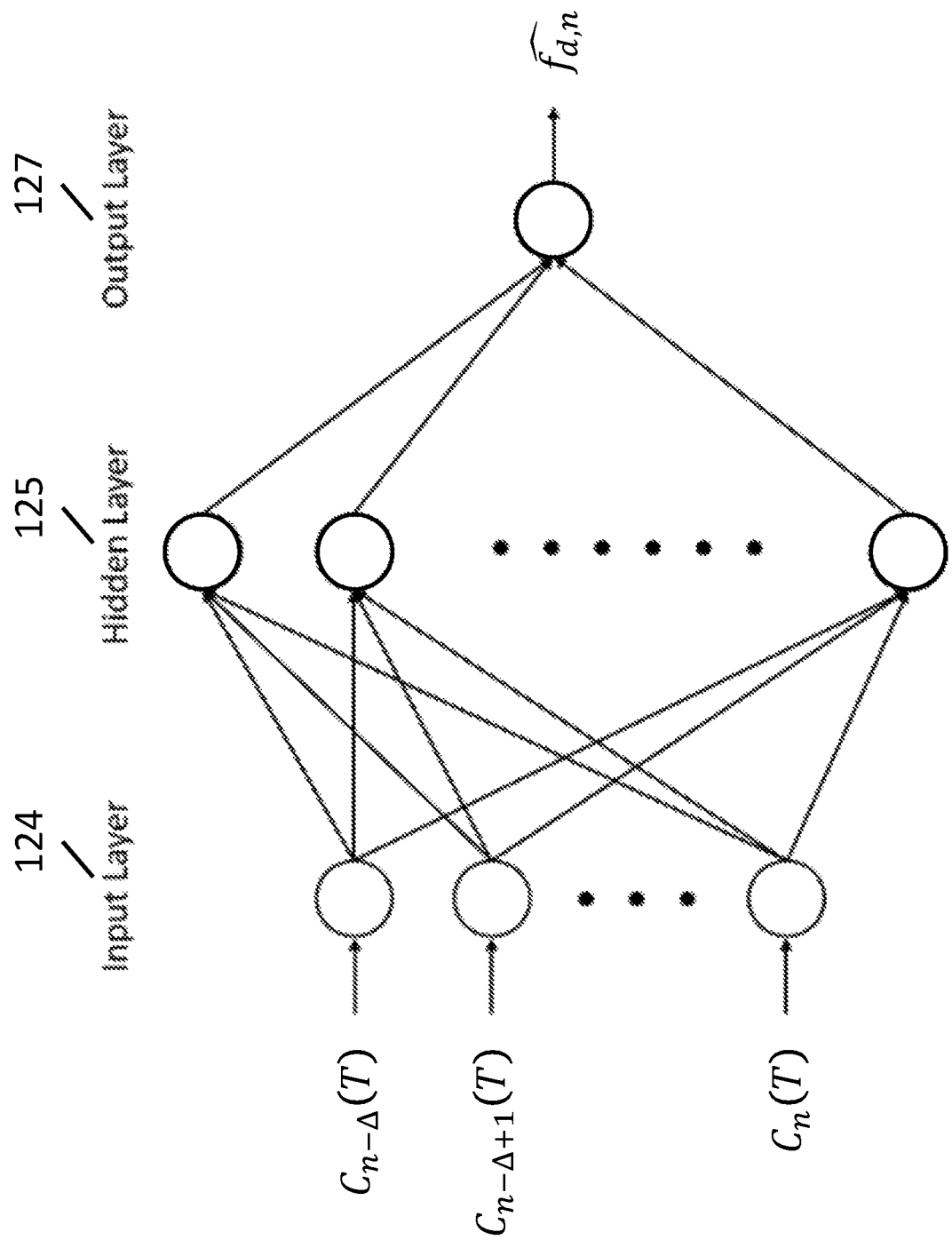
FIG. 11 is a schematic depiction of a Doppler shift predictor according to one embodiment of the present disclosure in which one or more channel correlations from a window of tracking reference signal (TRS) slots are supplied as input to a multi-layer perceptron.

FIG. 11 is a schematic depiction of a Doppler shift predictor according to one embodiment of the present disclosure in which a plurality of channel correlations from a window of TRS periods (e.g., from a causal window of previous TRS periods) are supplied as input to a multi-layer perceptron. In the embodiment shown in FIG. 11, a plurality of channel correlations from a causal window of prior TRS periods $C_{n-\Delta}(T), \ldots, C_{n-2}(T), C_{n-1}(T)$ (where $\Delta$ is the number of previous TRS periods or, equivalently, the size of the window in units of TRS period) is combined with the channel correlation estimated in the current TRS period $C_n(T)$ for a total of $\Delta+1$ channel correlations included among the input features supplied to an input layer 124 of the multi-layer perceptron, where the input layer 124 includes a separate node for each of the $\Delta+1$ channel correlations. Each of the channel correlations $C(T)$ is supplied from the nodes of the input layer 124 to each of the nodes of the hidden layer 125 multiplied by a corresponding weight (e.g., a weight learned during the training process). At each node in the hidden layer 125, all the incoming products (e.g., multiplications of channel correlations and weights) are summed and pass through an activation function (e.g., a sigmoid function). Each of the nodes of the hidden layer 125 supplies an output from the activation function to the output layer 127, which combines the outputs of the activation function of the hidden layer 125 to compute a predicted Doppler shift $f_{d,n}$, where the combining multiplying the outputs of the activation function of each of the nodes of the hidden layer with their corresponding weights (the weights being learned through the training process), summing the weighted products and passing the sum through an activation function (e.g., a sigmoid function or a rectified linear unit (ReLU)).

By including estimated channel correlations of the previous $\Delta$ TRS periods, these embodiments of the present disclosure provide more information to the Doppler shift predictor about how the channel changes over time. Furthermore, the training process trains the Doppler shift predictor to combine these estimated channel correlations using a learned set of parameters or coefficients, rather than fixing those coefficients according to an IIR filter. Because the learned parameters are capable of computing the same result as an IIR filter (e.g., it is possible that the learned coefficients will result in an IIR filter), the performance of a trained Doppler shift predictor using a plurality of channel coefficients from a causal window of previous TRS periods is expected to be no worse than an IIR filter.

A person of skill in the art would understand that the architectures shown in the embodiments of FIGS. 10 and 11 used to perform regression may be modified to perform classification into one of the M classes of ranges of Doppler shifts, as discussed above, by using M nodes in the output layer 127 and encoding the correct class of the training data using one-hot encoding.

As noted above, some embodiments of the present disclosure relate to a Doppler shift predictor using a multi-layer perceptron as a neural network for predicting a Doppler shift based on the supplied input features, such as the current channel correlation $C_n(T)$ and channel correlations from a window of a plurality of previous TRS periods $C_{n-\Delta}(T), \ldots, C_{n-2}(T), C_{n-1}(T)$. However, embodiments of the present disclosure are not limited thereto. For example, in some embodiments of the present disclosure, the current channel correlation $C_n(T)$ and channel correlations from a window of a plurality of previous TRS periods $C_{n-\Delta}(T), \ldots, C_{n-2}(T), C_{n-1}(T)$ are supplied as input features to a recurrent neural network (RNN) or a long short-term memory (LSTM) neural network.

Accordingly, aspects of embodiments of the present disclosure relate to systems and methods for computing an estimated Doppler spread based on information from input estimated channels, including channel correlations computed based on reference signals. According to some embodiments, the estimated Doppler spread is computed based on one or more trained Doppler shift predictors, where the Doppler shift predictors are trained based on collected measurements from actual physical radio receivers or from a practical link level simulator. Some aspects of embodiments of the present disclosure relate to selecting a Doppler shift predictor from a plurality of Doppler shift predictors based on a current estimated SNR, where each of the Doppler shift predictors is trained on a different portion of the training data, as grouped by portions of SNR range of the training data. Some aspects of embodiments of the present disclosure relate to combining the outputs of multiple Doppler shift predictors based on computing one or more probabilities that the input features correspond to each of the Doppler shift predictors trained on data from different portions of the Doppler shift range in the training data.

The term "processing circuit" is used herein to mean any combination of hardware, firmware, and software, employed to process data or digital signals. Processing circuit hardware may include, for example, radio baseband processors (BPs or BBPs), application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the present disclosure.

The terminology used herein is for the purpose of describing particular embodiments only and is not intended to be limiting of the disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method for estimating Doppler spread of a wireless channel comprising:
   extracting, by a processing circuit of a radio receiver, one or more features from a received signal, the features comprising an estimated channel correlation, estimated based on a reference signal in a current reference signal slot, the estimated channel correlation indicating a rate of change in a Doppler shift of the wireless channel over time; and
   computing, by the processing circuit, a Doppler spread of the wireless channel by supplying the features to one or more Doppler shift predictors trained on training data across a training signal-to-noise ratio (SNR) range and across a training Doppler shift range,
   wherein each Doppler shift predictor is trained on a portion of the training data corresponding to a different portion of the training SNR range or a different portion of the training Doppler shift range,
   wherein the Doppler shift predictors are trained using machine learning, and
   wherein the training data comprises data collected from operational radio communication systems relating channel correlations to Doppler spread.

2. The method of claim 1, wherein the estimated channel correlation comprises a single infinite-impulse response-filtered channel correlation.

3. The method of claim 1, wherein the features comprise one or more estimated channel correlations based on one or more reference signals in one or more previous reference signal slots.

4. The method of claim 1, wherein the reference signal is a tracking reference signal.

5. The method of claim 1, wherein each of the Doppler shift predictors is trained based on a different sub-range of the training SNR range, each sub-range having a lower bound corresponding to a first SNR and an upper bound corresponding to a second SNR, the first SNR being lower than the second SNR, and
   wherein the method further comprises:
   determining a current SNR of the received signal; and
   selecting a Doppler shift predictor from among the Doppler shift predictors based on the current SNR, the lower bound of the corresponding sub-range of the selected Doppler shift predictor being higher than the current SNR.

6. The method of claim 5, wherein the lower bound of the corresponding sub-range of the selected Doppler shift predictor is closest to the current SNR among the lower bounds of sub-ranges that are higher than the current SNR.

7. The method of claim 1, wherein each of the Doppler shift predictors is trained based on a different sub-range of the training Doppler shift range, and
   wherein the method further comprises:
   computing, by the processing circuit, one or more classification probabilities by supplying the features to a Doppler shift classifier network, each of the classification probabilities corresponding to a different one of the Doppler shift predictors,
   wherein the features are supplied to the Doppler shift predictors to compute one or more predicted Doppler shifts, and
   wherein the computing the Doppler spread comprises combining the predicted Doppler shifts in accordance with the classification probabilities.

8. The method of claim 7, wherein the combining the predicted Doppler shifts comprises summing one or more products of the predicted Doppler shifts multiplied by corresponding ones of the classification probabilities.

9. The method of claim 7, wherein the combining the predicted Doppler shifts comprising outputting, from among the predicted Doppler shifts, a highest probability predicted Doppler shift corresponding to a highest classification probability of the classification probabilities.

10. The method of claim 1, wherein the training SNR range of the training data is larger than an operating SNR range of the radio receiver.

11. The method of claim 1, wherein each of the Doppler shift predictors is trained to compute a predicted Doppler shift based on a regression model.

12. The method of claim 1, wherein each of the Doppler shift predictors is trained to classify the features by computing one or more probabilities that the features correspond to each of one or more ranges of Doppler shifts.

13. The method of claim 1, wherein each of the Doppler shift predictors is a multi-layer perceptron.

14. A radio receiver comprising a channel estimator processing circuit, the channel estimator processing circuit comprising:
   a feature extractor configured to extract one or more features from a received signal, the features comprising an estimated channel correlation, estimated based on a reference signal in a current reference signal slot, the estimated channel correlation indicating a rate of change in a Doppler shift of a wireless channel over time; and a Doppler spread estimator configured to estimate a Doppler spread of the wireless channel by supplying the features to one or more Doppler shift predictors trained on training data across a training signal-to-noise ratio (SNR) range and across a training Doppler shift range, wherein each Doppler shift predictor is trained on a portion of the training data corresponding to a different portion of the training SNR range or a different portion of the training Doppler shift range, wherein the Doppler shift predictors are trained using machine learning, and wherein the training data comprises data collected from operational radio communication systems relating channel correlations to Doppler spread.

15. The radio receiver of claim 14, wherein the estimated channel correlation comprises a single infinite-impulse response-filtered channel correlation.

16. The radio receiver of claim 14, wherein the features comprise one or more estimated channel correlations based on one or more reference signals in one or more previous reference signal slots.

17. The radio receiver of claim 14, wherein the reference signal is a tracking reference signal.

18. The radio receiver of claim 14, wherein each of the Doppler shift predictors is trained based on a different sub-range of the training SNR range, each sub-range having a lower bound corresponding to a first SNR and an upper bound corresponding to a second SNR, the first SNR being lower than the second SNR, and wherein the channel estimator processing circuit further comprises:

an SNR extractor configured to extract a current SNR of the received signal; and a predictor selector configured to select a Doppler shift predictor from among the Doppler shift predictors based on the current SNR, the lower bound of the corresponding sub-range of the selected Doppler shift predictor being higher than the current SNR.

19. The radio receiver of claim 18, wherein the lower bound of the corresponding sub-range of the selected Doppler shift predictor is closest to the current SNR among the lower bounds of sub-ranges that are higher than the current SNR.

20. The radio receiver of claim 14, wherein each of the Doppler shift predictors is trained based on a different sub-range of the training Doppler shift range, and wherein the Doppler spread estimator comprises a Doppler shift classifier network configured to compute one or more classification probabilities that the features belong to classes corresponding to the Doppler shift predictors, wherein the Doppler spread estimator is configured to supply the one or more features to the Doppler shift predictors to compute one or more predicted Doppler shifts, and wherein the Doppler spread estimator is configured to compute the Doppler spread by combining the predicted Doppler shifts in accordance with the classification probabilities.

21. The radio receiver of claim 20, wherein the Doppler spread estimator is configured to combine the predicted Doppler shifts by summing one or more products of the predicted Doppler shifts multiplied by corresponding ones of the classification probabilities.

22. The radio receiver of claim 20, wherein the Doppler spread estimator is configured to combine the predicted Doppler shifts by outputting, from among the predicted Doppler shifts, a highest probability predicted Doppler shift corresponding to a highest classification probability of the classification probabilities.

23. The radio receiver of claim 14, wherein the training SNR range of the training data is larger than an operating SNR range of the radio receiver.

24. The radio receiver of claim 14, wherein each of the Doppler shift predictors is trained to compute a predicted Doppler shift based on a regression model.

25. The radio receiver of claim 14, wherein each of the Doppler shift predictors is trained to classify the features by computing one or more probabilities that the features correspond to each of one or more ranges of Doppler shifts.

26. The radio receiver of claim 14, wherein each of the Doppler shift predictors is a multi-layer perceptron.

* * * * *